No. 713,393. Patented Nov. 11, 1902.
J. W. BULLER.
TRACTION ENGINE COUPLING.
(Application filed July 2, 1902.)
(No Model.)
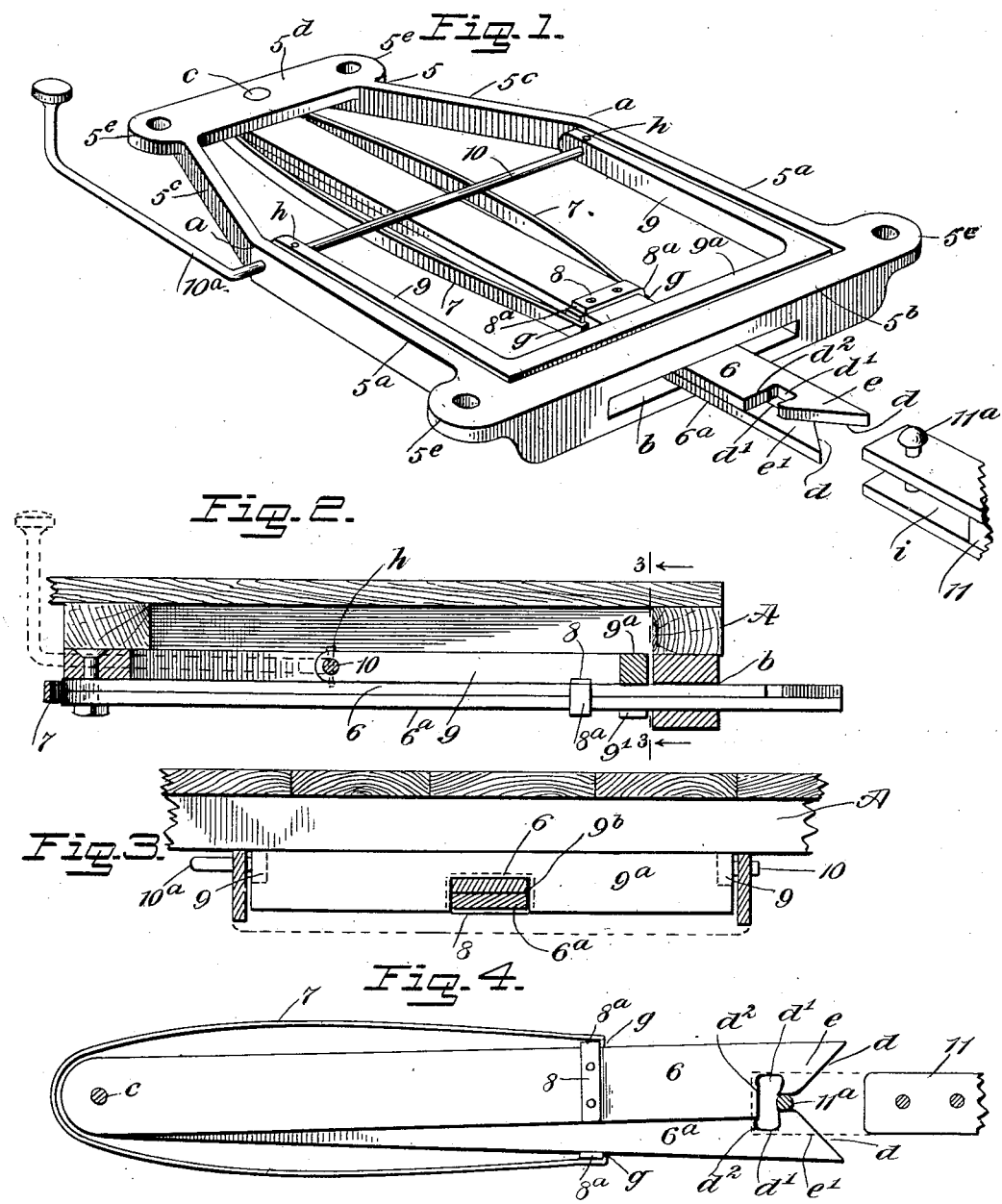
WITNESSES:
James F. Duhamel
Wm. P. Patton
INVENTOR
Jacob W. Buller
BY
ATTORNEYS.

UNITED STATES PATENT OFFICE.

JACOB W. BULLER, OF JANSEN, NEBRASKA.

TRACTION-ENGINE COUPLING.

SPECIFICATION forming part of Letters Patent No. 713,393, dated November 11, 1902.

Application filed July 2, 1902. Serial No. 114,058. (No model.)

*To all whom it may concern:*

Be it known that I, JACOB W. BULLER, a citizen of the United States, and a resident of Jansen, in the county of Jefferson and State of Nebraska, have invented a new and Improved Traction-Engine Coupling, of which the following is a full, clear, and exact description.

This invention relates to means for detachably connecting a traction-engine to the tender therefor, and likewise for connecting the fuel and water supplying tender with a portable threshing-machine or other wagon for its progressive movement, and has for its object to provide novel details of construction for a device of the character indicated which adapt it for very reliable and convenient service, enabling the automatic connection of the engine with a vehicle to be drawn thereby and also facilitating their disconnection.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the device detached from an engine. Fig. 2 is a longitudinal sectional view of a traction-engine platform and of the improvement applied thereupon. Fig. 3 is a transverse sectional view substantially on the line 3 3 in Fig. 2; and Fig. 4 is a plan view of the twin draft-bars, the draw-bar for a wagon or tender that connects with the draft-bars, and a spring-closer for the draft-bars engaged therewith.

In the drawings, that show the invention and its application, 5 represents the frame of the coupling device, formed of metal, having the parallel side bars $5^a$ joined at one end to the integral front cross-bars $5^b$.

At the rear ends of the parallel bars $5^a$ integral portions $5^c$ thereof are bent toward each other at equal obtuse angles $a$, these converged frame members joining the rear transverse frame-bar $5^d$.

As shown, laterally-projected ears $5^e$ are preferably formed at the corners of the frame 5 to receive bolts for connection of said frame with the platform A, that is a rearward projection from the rear end of a traction-engine of any preferred style. (Not shown.)

The front cross-bar $5^b$ is longitudinally slotted between the ends thereof, as shown at $b$ in Figs. 1 and 2, this provision accommodating the paired draft-bars 6 $6^a$, that are loosely introduced therein and extend from their forward ends that project a suitable distance in advance of the front cross-bar $5^b$ to engage the lower surface of the rear cross-bar $5^d$, whereon they are imposed in lapped condition and pivoted thereto, as indicated at $c$ in Fig. 1, said pivot also appearing in Fig. 4.

The lapped draft-bars 6 $6^a$ are of equal length from their pivot connection $c$ to their forward free ends, and, as shown in Figs. 1, 2, and 4, each bar is cut away at adjacent corners, so as to produce like slopes $d$ thereon, that merge into the lateral notches $d'$, whereby the similar latch-hooks $e$ $e'$ are produced on said ends of the draft-bars, and it will be seen that the transverse shoulders $d^2$, that define the rear edges of the notches $d'$, extend inwardly from the inner edge of each draft-bar. A looped spring 7, having such contractile strength as will enable it to normally press the lapped and pivoted draft-bars 6 $6^a$ into closed adjustment, has its free ends bent inwardly, so as to produce locking-toes $g$ thereon, which are disposed opposite each other, as shown in Fig. 4.

Upon each draft-bar 6 $6^a$ a guard-plate 8 is secured, these flat plates each having an end portion $8^a$ bent at a right angle thereon, and said angularly-disposed abutment-flanges $8^a$ are held as lateral projections on the outer edges of the draft-bars 6 $6^a$ when the main members of the guard-plates are affixed transversely upon the upper and lower sides of said draft-bars.

It will be seen in Figs. 1 and 4 that the locking-toes $g$ on the looped spring 7 engage with the rearward vertical edges of the abutment-flanges $8^a$, whereby the spring is held in operative connection with the draft-bars 6 $6^a$. Furthermore, the construction and relative connection of the guard-plates 8, together with the abutment-flanges $8^a$ thereon, adapt the latter-named parts to have contact with the ends of the guard-plates when the draft-bars are closed a proper degree, and thus prevent the spring from moving the draft-bars farther than to aline their side edges in pairs with each other, as represented in Figs. 1 and 3.

A rocking detent-frame is provided which is designed to hold the draft-bars 6 6$^a$ in closed condition, free to be released as occasion may require. This frame consists of two side bars 9 9, held spaced apart parallel with each other by the preferably integral transverse bar 9$^a$, the bars 9 being separated sufficiently to enable their outer surfaces to loosely contact with the inner surfaces of parallel members 5$^a$ of the frame 5.

The side bars 9 are pivoted upon the parallel frame members 5$^a$, near the free ends of said side bars, by the transverse rock-shaft 10, journaled in the frame 5, near the junction of the members 5$^a$ 5$^c$ of the same, and the shaft is secured in the side bars by pins $h$, as indicated in Figs. 1 and 2.

A tripping-arm 10$^a$ is formed or secured upon one extended end of the rock-shaft 10, said arm projecting alongside of the frame 5, and at a suitable distance from the rock-shaft the arm is bent upwardly, so that it may extend through and above the platform A, that is secured at the rear end of a traction-engine, (not shown,) the upper end of the upright arm preferably having a foot-block thereon to receive the tread of an engineman's foot.

The transverse bar 9$^a$ is notched in its lower edge rectangularly at a point immediately above the draft-bars 6 6$^a$, and said notch 9$^b$ is of such relative width as will permit the closed side bars to enter the notch and be loosely embraced by the side members of the latter, when the rocking detent-frame is permitted by its gravity to rock down into a horizontal plane, which will render its upper surface flush with that of the frame 5, as represented in Fig. 2.

A coupling-bar 11 (shown broken away in Fig. 1) in complete form projects from one end of a traction-engine tender, an end of a threshing-machine mounted on wheels, or other heavy vehicle that is to be drawn by the engine having the improvement.

The coupling-bar 11 consists of a metal block formed with a longitudinal slot at its center of thickness, said slot $i$ having such dimensions between the upper and lower walls of the bar as will permit the free introduction of the lapped draft-bars therein at their projecting latch-hook ends $e$ $e'$.

A coupling-pin 11$^a$ is inserted in vertically-alined perforations formed in the spaced upper and lower walls of the coupling-bar 11, at the transverse center thereof.

In effecting an automatic coupled engagement of the bar 11 with the draft-bars 6 6$^a$ the engine is moved toward the vehicle that is to be coupled therewith, so as to introduce the latch-hook ends $e$ $e'$ into the slot $i$. The pin 11$^a$ will thus be caused to press upon the sloped edges $d$ of the latch-hooks $e$ $e'$ and spread the latter, so as to permit the passage of the pin into the notches $d'$, that will together freely receive the pin and clasp it when the draft-bars are pressed together by the looped spring 7.

In effecting the coupled connection of an engine with a vehicle, as just described, it is obvious that the engineman must press upon the arm 10$^a$, so as to rock the detent-frame upwardly at its rear end, which will raise the transverse bar 9$^a$, so that the side shoulders of the notch 9$^b$ will release the draft-bars 6 6$^a$ and permit them to be spread apart at their latching ends, and after a coupled connection has been effected, as explained, this may be rendered secure by dropping the detent-frame into normal position, so that the side walls of the notch 9$^b$ will embrace the side edges of the closed draft-bars 6 6$^a$. To uncouple the device, the pin 11$^a$ is withdrawn from the coupling-bar 11. It will be seen that the construction of the improved coupling device is very simple, inexpensive, and convenient, affording reliable means for automatically coupling together a motor and a tender or other wheeled structure.

Having described my invention, I claim as new and desire to secure by Letters Patent—

1. A coupling, comprising a frame, having a slotted cross-bar at one end, two lapped draft-bars, each provided with a latch-hook at like ends, said bars passing through the slotted cross-bar and having pivoted connection with an opposite cross-bar of the frame, and a spring pressing the cross-bars toward each other.

2. An engine-coupling, comprising a main frame, having a slotted cross-bar at one end thereof, two lapped flat draft-bars, each having a draft-hook at a like end, which hooks project toward each other, the draft-bars passing through the slotted cross-bar and having pivoted connection with an opposite cross-bar of the frame, and a looped contractile spring engaged at its ends with the draft-bars, normally closing them.

3. An engine-coupling, comprising a main frame, having parallel side bars, and a cross-bar that is slotted longitudinally, two flat lapped draft-bars each having parallel side edges and a laterally-projected latch-hook, said hooks projecting toward each other, the draft-bars passing through the slotted frame cross-bar and pivoted together upon an opposite cross-bar, a looped contractile spring engaged at its ends with the draft-bars, normally closing them, means to limit the closure of said draft-bars, a detent-frame held to rock between the parallel members of the main frame, and means for rocking said detent-frame.

4. An engine-coupling, comprising a main frame, having an end cross-bar that is slotted longitudinally, two flat lapped draft-bars, each having parallel side edges and a laterally-projected latch-hook, said hooks projecting toward each other, the draft-bars passing through the slotted cross-bar and being pivoted together upon an opposite cross-bar, a looped contractile spring engaged at its ends with the draft-bars and normally closing them, guard-plates having abutment-flanges adapted to limit the closure of the draft-bars, a notched detent-frame pivoted in the main frame so that the notch therein will embrace the draft-bars to prevent them from diverging, and a tripping-arm adapted to lift the notched end of the detent-frame when said arm is depressed.

5. An engine and tender coupling, comprising a main frame securable on a platform for the engine, two lapped draft-bars pivoted at one end on a cross-bar of the main frame, means for supporting the opposite ends of the draft-bars projected from the main frame, said ends having lateral latch-hooks thereon, a rockable detent-frame, adapted to hold the draft-bars closed when engaged therewith, means for rocking the detent-frame away from the draft-bars, a slotted coupling-bar on the tender, adapted to receive the latch-hooks in its slot, and a coupling-pin carried by the coupling-bar and adapted to engage with the latch-hooks.

In testimony whereof I have signed my name to this specification in the presence of two subscribing witnesses.

JACOB W. BULLER.

Witnesses:
BENJAMIN F. KNAPP,
JOHN A. THIESSEN.